F. Clymer.

Growing Fruit.

N° 86,733. Patented Feb. 9, 1869.

Witnesses;
Edwin James
John D. Bloor

Inventor;
F. Clymer
per Holmead & Hollingshead
Attorneys

FRANCIS CLYMER, OF GALION, OHIO.

*Letters Patent No. 86,733, dated February 9, 1869.*

IMPROVEMENT IN A METHOD FOR GROWING FRUIT ANNUALLY.

The Schedule referred to in these Letters Patent and making part of the same.

*To all whom it may concern:*

Be it known that I, FRANCIS CLYMER, of Galion, county of Crawford, and State of Ohio, have invented certain new and useful Improvements in the Method of Growing Fruit Annually; and I do hereby declare that the following is a full, clear, and exact description of the same, reference being had to the accompanying drawing, and the letters of reference marked thereon, making part of this specification, in which—

Figure 5 is a plan view of the ground-spike, or chisel.

Figure 1:
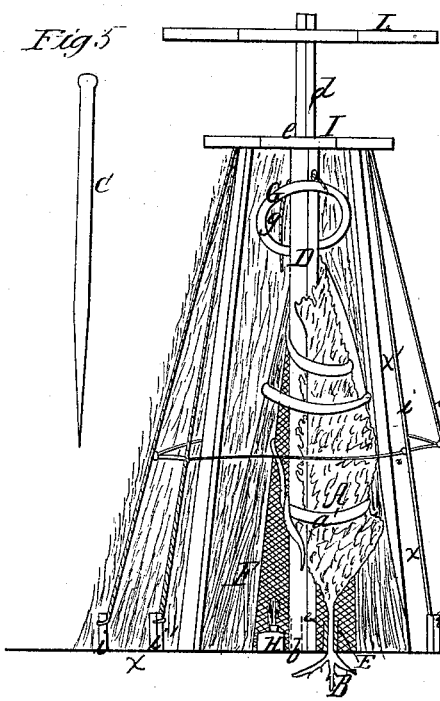
Figure 1 is a front view, the tree bound, and the hood open, showing the general arrangement of the different parts.

The nature of my invention consists in taking a fruit-tree, of a year's growth, and one that has been raised from the bud or graft, and so topping or cutting off the upper portion of the same, as not only to check almost entirely the tendency to a luxuriant upward growth, but causing the entire strength and vigor of the tree to be employed in throwing out lateral branches from below. The roots I also cut at a certain point, so that, at the desired period, I am enabled, by means of a suitable implement, to make an opening in the earth, close alongside of the tree, in which to plant a stake, or prop-pole, without the slightest danger of injuring or in any manner interfering with the embedded roots.

The tree, thus cut, and planted at a proper time, I so tie, or lash, by means of a system of binding, in such a manner that, when the cords are released, the tree is perfectly symmetrical, and of a pyramidal form.

This not only gives to the tree an ornamental appearance, but enables me to dispense almost entirely with all superfluous branches, and also leaves the tree of that shape that can the most readily be encased in a hood, which is one of the prominent features of my invention.

To guard the tree from frost and wind, and especially the early spring frost, I use a hood. This hood I propose to construct of heavy brown paper, such as is used by grocers for flour-bags. The paper may be tarred, in the same manner as is usual when the paper is intended for roofing-purposes, or it may be oiled or covered with any of the well-known water-proof compositions, so as to render the hood impervious to the action of the weather; or, instead of paper, the hood may be constructed of oil-cloth, or of any suitable textile fabric.

The hood is constructed in a conical shape, so as to conform to the contour of the tree, and is made with a central opening, so that it can be thrown apart when desired, and is securely retained, at any desired position, by means of a ring.

I furnish the tree with a metallic protector, extending a short distance from the ground, and filled with some suitable composition to protect the tree during winter from rats, mice, and gophers, and also to defend the same in summer against the fearful ravages of the peach-grub. An additional heat can readily be furnished, simply by placing a lamp, or burning taper of any suitable kind, under the hood.

A lamp can also be advantageously used for the purpose of exterminating insects, simply by filling the same with coal-tar, sulphur, or brimstone.

When the climate is very cold, or the winter bids fair to be a rigorous one, the device consisting of a symtem-cap, stake, slat, and braces, such as described in my patent of November 27, 1866, may advantageously be used as a basis on which to lash a suitable covering of thatch, hemp, straw, or corn-fodder. Should it be considered desirable, this outer frame-work can readily be duplicated, simply by constructing the upper section of the stake or prop-pole square, and placing an additional section thereto, which passes through an opening in the cap, or plate, and furnishes a bearing for a duplicate plate above, to which is connected a like series of slats, rods, or cords, thus furnishing a double instead of a single set of protectors.

To enable others skilled in the art to make and use my invention, I will now proceed to minutely describe its construction and operation.

A is a tree raised from a bud, or graft. At the end of the first season, its top had so been cut off as to check the tendency to simply grow upward, and as a consequence, this act of lopping in no way impairing the strength or the vitality of the tree, its entire vigor has been still employed in throwing out lateral branches, but from each eye in the lower section of the stalk.

B are the roots, and are so cut away, at a certain quarter of their surface, as to leave an open space, *b*.

In planting the tree, particular care is taken to note the exact point at which this opening is left, so that when desirable to insert the spike, or chisel, the same can freely be done, not only thus avoiding contact with all impediments, but also rendering it impossible for the implement in any manner to injure the embedded root.

Then, late in the fall or early in the winter, I take a square steel-pointed chisel, or spike, as shown at C, fig. 5, and insert or drive the same in the ground at a point that will insure its passing through the opening *b* in the roots, immediately alongside of the tree, and as close to the same as the trunk will allow.

The chisel, or spike, C, is then withdrawn, and in the opening thus made I insert a stake, or prop-pole, D, constructed of wood, either round or square in form, and of a height equal to that of the tree, when the same has attained its full growth.

The tree is pruned in such a manner as to give to the same a pyramidal form.

I then take a strap, of leather or cloth, of suitable width, and, commencing at the lower branch, gently bind the limbs to a certain point, say at *x*, fig. 1.

When, by this means, the limbs of this section of the tree are sufficiently compressed, I tie the same with a cord, *a*, and in the well-known manner in which the ordinary sheaf is bound.

I then remove the strap, and repeat the operation, this time embracing the section of the tree, say, from *x* to *x'*, fig. 1, and secure the same by means of the cord *a'*, as before described.

In the drawing, the entire tree is held by two cords, but it will readily be perceived that, in practical application, frequently many more cords can be advantageously employed.

E is a protector, and is an open scroll in form, and flawed at the top, so as to give to the same a funnel-shape, and is constructed of any suitable metal, such as sheet-lead, tin, or zinc.

This protector E encircles the tree, and is held close to the same by means of a rubber band, *e*.

The advantage of the arrangement of the open scroll and rubber is this: While the protector is held sufficiently close to the tree to successfully accomplish the desired object, still it is so constructed and retained as to readily accommodate itself to the natural expansion of the tree.

This protector is inserted in the ground, and buried as deep as the upper surface of the roots will allow. This is done to prevent any vermin from entering underneath the protector, no matter how small the same may be.

The simple metallic protector is sufficient for all winter-purposes, such as to shield the trunk from the inroads of rats, mice, gophers, &c.

Early in the spring, I fill the funnel of the protector with a composition composed of equal parts of salt and ashes, mixing therewith some powdered sulphur, which most effectually guards against the ravages of the peach-worm.

Figure 2:
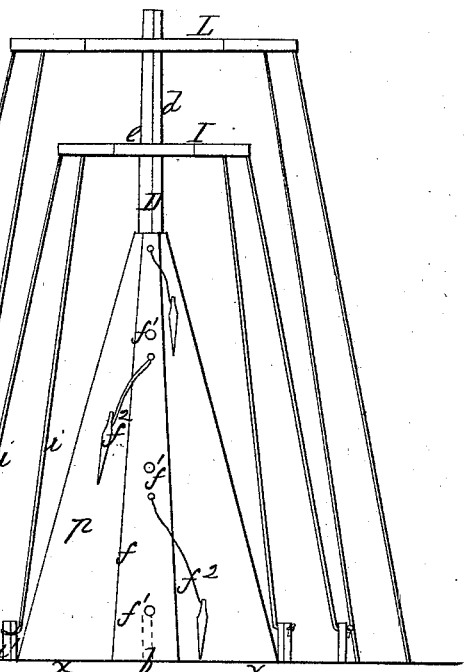
Figure 2 is a plan view, with the hood closed.
Figures 3, 6:
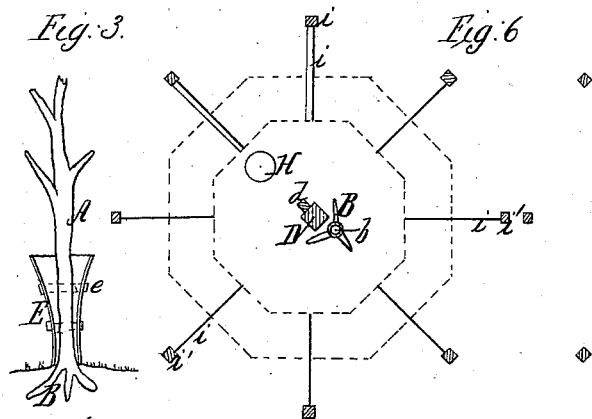
Figure 3 is a sectional view of the tree and protector.
Figure 6 is a lower sectional view of fig. 1.
Figure 4:
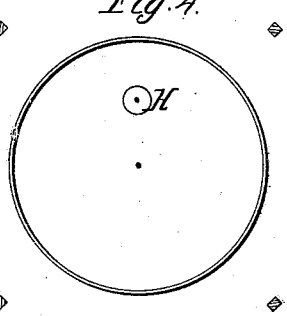
Figure 4 is a lower sectional view of fig. 2.

F is a hood, made of paper, suitably tarred, oiled, or covered with some water-proof composition; or, instead of paper, oil-cloth, or any suitable textile fabric may be used. This hood is cut so as to present a circular conical form when closed, as shown in fig. 2.

It will be observed that a hood of this pattern fits exactly the form of the tree, when trimmed and compressed, as described.

*f f* are two wooden slats attached to the edges of the opening in the hood.

These slats are provided with a series of holes, $f^1 f^1$, by which means, in connection with the cords and pins $f^2 f^2$, the hood can be securely closed.

Or, instead of the wooden slats, an additional layer or two of paper may be secured to each edge of the opening, in which is inserted a series of eyelets, whereby the hood can be securely closed, simply by lacing the same with a cord, or connecting-pins, or other equivalent device.

This hood F is so placed on the tree that its opening has a southerly exposure. By this means, in the spring, the nights still continuing cool and frosty, the tree is safely shielded, while during the day, the same being pleasant, the pins $f^2 f^2$ can be withdrawn, and the hood F rolled back, as shown in fig. 1, and securely held, at any desired point, by means of the loose ring G, attached to a cord, *g*, which passes through an opening, *g'*, in the pole, or stake, D.

H is a lamp, that can be lighted at night and placed under the closed hood F, whereby a mild and gentle heat is afforded the tree.

My invention, thus far described, shows clearly the method of cutting the tree and its roots, and also the means, and their arrangement, whereby the tree can safely be protected from the weather, and entirely guarded against the attack of all vermin, the former during a greater portion, and the latter during the entire year.

But during the very severe weather, such as mid-winter, to fully attain the results at which I aim, an additional or outer protector may not only be advantageously used, but rendered necessary. I provide this outer protector thus:

To the head of the pole D, I secure a circular plate, I, to the under surface of which, by means of staples or other equivalent device, I secure a series of radial depending stays, or slats, *i i*. These may be made of wood, wire, or tarred rope, and are securely keyed, at their lower ends, to wooden pins *i' i'*, which are securely driven and firmly held in the ground, represented by X.

These slats *i i* furnish a basis to which can be firmly attached a covering of thatch, hemp, straw, or corn-fodder, which furnishes a sure, durable shield against the rigor of the weather, frost, and snow.

It will be observed that, in its outline of construction, this outer protector closely resembles the plan embraced in and covered by my patent of November 27, 1866.

Should it be deemed desirable, and doubtless, in very cold climates, such instances will frequently be met with, my invention affords the means whereby the outer protector can readily be duplicated. To do this, the pole D is constructed square in its upper section, to which is spliced a pole, *d*, which passes through an opening, *l*, in the plate I, and near the centre of the same, to which is attached a circular plate, L. The arrangement of stays or cords, and their attachments, corresponds exactly with that already described.

Another advantage of my invention is found in the ready means whereby I can thoroughly fumigate the plant, thus destroying every species of insect, which I do simply by burning under the hood, thus confining the smoke, &c., coal-tar, sulphur, or brimstone.

Having thus fully and minutely described my invention,

What I claim therein as new, and desire to secure by Letters Patent of the United States, is—

1. The pole D and cords *a* and *a'*, when used in combination with the hood F, and the same are so arranged that the tree can be conveniently compressed so as to be covered by the hood, substantially as described, as and for the purpose specified.

2. Retaining the paper hood F, when partially folded, by means of a ring, G, substantially as described, as and for the purpose specified.

3. The hood F and lamp H, when the same are so arranged that an artificial heat can be supplied to the tree, in the manner substantially as described, as and for the purpose specified.

4. The additional pole *d* and plate L, when the same are arranged and applied substantially as described, as and for the purpose specified.

In testimony whereof, I have signed my name to this specification, in the presence of two subscribing witnesses.

F. CLYMER.

Witnesses:
 EDWIN JAMES,
 JOHN D. BLOOR.